J. GRIBBEL.
VALVE DEVICE FOR PREPAYMENT METER MECHANISM.
APPLICATION FILED APR. 10, 1914.
1,187,425.
Patented June 13, 1916.
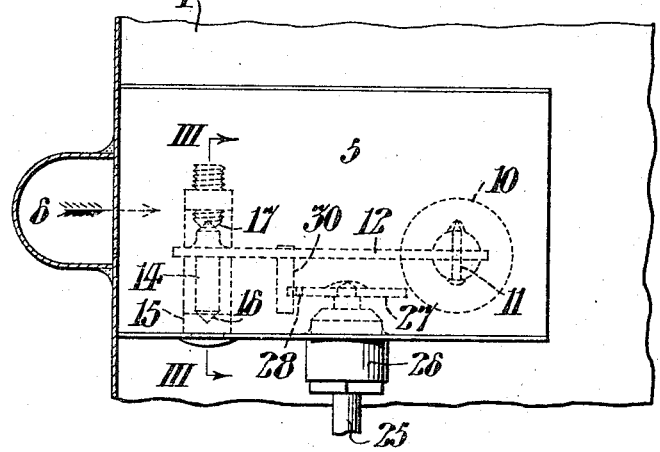
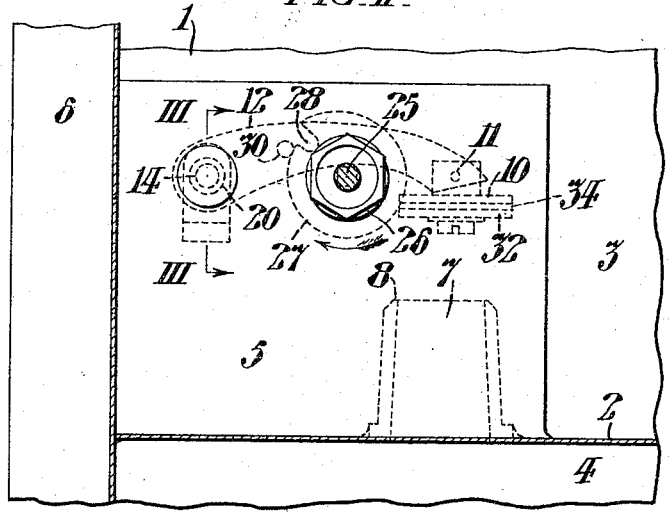
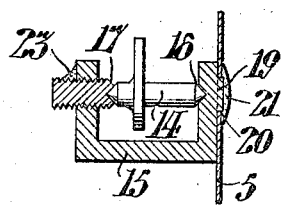
WITNESSES:
Philip W. Vessey
Anna Israelvitz
INVENTOR:
JOHN GRIBBEL,
by Arthur E. Paige,
Attorney.

UNITED STATES PATENT OFFICE.

JOHN GRIBBEL, OF PHILADELPHIA, PENNSYLVANIA.

VALVE DEVICE FOR PREPAYMENT-METER MECHANISM.

1,187,425.  Specification of Letters Patent.  Patented June 13, 1916.

Application filed April 10, 1914. Serial No. 830,904.

*To all whom it may concern:*

Be it known that I, JOHN GRIBBEL, a citizen of the United States, residing at Philadelphia, in the State of Pennsylvania, have invented a certain new and useful Improvement in Valve Devices for Prepayment-Meter Mechanism, whereof the following is a specification, reference being had to the accompanying drawing.

My invention is designed for a meter wherein the flow of gas is controlled by a valve secluded in a box in the meter casing having a gas supply inlet and a gas port leading from said box to the bellows or other measuring element of the meter. As ordinarily constructed, such a valve is hung on a lever carried by a rock shaft, whereby it is oscillated to and from a seat surrounding said port, and said rock shaft extends through a bearing in the wall of said box and is directly connected with coin controlled valve mechanism, exterior to said box. Such construction necessitates a gas tight packing for the bearing of said rock shaft; and variations in the pressure of said packing, incident to its initial adjustment and subsequent condition, subject said shaft to variable friction which renders the operation thereof uncertain, as the power for closing said valve is solely derived from the comparatively slight pressure of the gas upon the bellows or other measuring element of the meter mechanism, and, sometimes, the friction upon the rock shaft is so great as to prevent the operation of the valve closing mechanism, and consequently the meter mechanism continues to deliver gas after the passage of the quantity for which prepayment has been made.

Therefore, it is an object of my invention to prevent variation in the amount of friction to which the valve rock shaft may be subjected, and to reduce such friction to the minimum so that said valve may automatically gravitate to closed position upon the passage of the quantity of gas for which prepayment has been made.

As hereinafter described, my invention includes a valve carried by a rock shaft, having a valve opening mechanism entirely independent of said shaft.

My invention includes the various novel features of construction and arrangement hereinafter more definitely specified.

In the drawings; Figure I is a fragmentary plan sectional view of a meter embodying my invention. Fig. II is a sectional elevation of the structure shown in Fig. I. Fig. III is a fragmentary vertical sectional view taken on the line III, III in Figs. I and II.

In said figures; the meter casing 1 has the table partition 2 between the compartments 3 and 4 supporting the valve box 5 which is in communication with the gas inlet 6 and incloses the port 7 leading to the bellows (not shown) in the compartment 4. Said port 7, surrounded by the valve seat 8, is arranged to be closed by the valve 10 which is hung by the pivot 11 upon the lever 12 which is carried by the rock shaft 14. Said shaft 14 terminates, at both ends, within said box inclosure and is journaled in the bracket 15 which has the stationary conical seat 16 for one end of said rock shaft 14 and the movable conical seat 17 for the other end of said rock shaft. As best shown in Fig. III, said bracket has the projection 19 fitting the aperture 20 in the wall of said box 5; which aperture is sealed by the solder 21 which rigidly secures said bracket in the position which is precisely determined by the location of said aperture. As best shown in Fig. III, said movable bearing member 17 is a screw which is adjustable in engagement with said bracket 15 and conveniently held in adjusted position by the solder 23. The construction and arrangement above described is such as to reduce the friction upon said rock shaft to the minimum so that said valve automatically gravitates to closed position upon said seat 8 when released by the valve opening mechanism. The valve opening mechanism is entirely independent of said rock shaft 14 which carries the valve 10, as above described, and includes the driving shaft 25, which is parallel with said rock shaft 14, extends through the bearing 26 in the wall of said box 5, and carries, within said box, the cam 27 having the peripheral notch 28 for engagement with the pin 30 on said lever. It is to be understood that when the valve is closed and said driving shaft 25 is manually turned in the direction of the arrow shown in Fig. II, (by operative connection with the coin controlled mechanism, not shown, or otherwise) said cam 27 engages said pin 30 and raises said valve 10 to the open position shown in Fig. II. The operation of the meter mechanism, in connection with said shaft 25, turns the latter in the reverse direction and it is to be understood that when said notch 28 registers with said pin 30 of the valve lever 12, the latter is released so that it may gravitate, with the valve 10, to permit the latter to automatically close the port 7; such closing movement being entirely independent of the valve opening mechanism including said cam 27. However, I find it convenient to form one side of said notch 28 of such radial extent that said valve 10 may be positively pressed upon its seat by continued rotation of said shaft 25 in the direction opposite to that indicated by the arrow in Fig. II.

It may be observed that the construction and arrangement above described is such that whenever the lever is released by the valve opening mechanism, the valve is free to close with the minimum frictional restraint upon its closing movement, but, if the meter mechanism continues to operate after such closure of the valve, the effect thereof is to positively press the valve tighter upon its seat and thus prevent leakage of gas through the port 7.

In order to insure the closure of the port 7 by said valve 10, I prefer to provide the latter with the facing 32 of soft leather saturated with oil, and to interpose a felt washer 34 between said leather facing and the valve 10, so that said valve shall tightly fit said seat even when the latter is rendered uneven by the deposit of sediment from the gas.

I do not desire to limit myself to the precise details of construction and arrangement herein set forth, as it is obvious that various modifications may be made therein without departing from my invention as defined in the appended claims.

I claim:—

1. In a prepayment gas meter, a valve port having a seat; an inclosure for said port having a gas inlet; a valve for said port; a lever pivotally connected with said valve; a rock shaft carrying said lever, and terminating, at both ends, within said inclosure; a bearing bracket for said rock shaft having a stationary conical socket for one end of said rock shaft and a movable screw bearing with a conical socket for the other end of said rock shaft; said bracket having a projection fitting an aperture in the wall of said inclosure, whereby its position is precisely determined; means sealing said aperture and securing said bracket; means arranged to actuate said valve, including a driving shaft, parallel with said rock shaft, extending through the wall of said inclosure; a cam on said driving shaft within said inclosure, having a notch; and, a pin on said lever extending parallel with said driving shaft, arranged to be engaged by said cam in open position, and to register with said notch in closed position; whereby, rotation of said driving shaft in one direction opens said valve, and rotation of said driving shaft in the opposite direction releases said valve to gravitate upon its seat.

2. In a prepayment gas meter, a valve port having a seat; an inclosure for said port having a gas inlet; a valve for said port; a lever pivotally connected with said valve; a rock shaft carrying said lever and terminating, at both ends, within said inclosure; a bearing bracket for said rock shaft, having a projection fitting an aperture in the wall of said inclosure, whereby its position is precisely determined; means arranged to actuate said valve, including a driving shaft, parallel with said rock shaft, extending through the wall of said inclosure; a cam on said driving shaft within said inclosure; and a pin on said lever extending parallel with said driving shaft and arranged to be engaged by said cam; whereby, rotation of said driving shaft in one direction opens said valve, and rotation of said driving shaft in the opposite direction releases said valve to gravitate upon its seat.

3. In a prepayment gas meter, a valve port having a seat; an inclosure secluding said port; a valve for said port; a rock shaft carrying said valve, and terminating, at both ends, within said inclosure; a bearing bracket for said rock shaft, primarily separate from the wall of said inclosure, having a projection fitting an aperture in the wall of said inclosure, whereby its position is precisely determined; and means, within said inclosure, independent of said shaft, arranged to rock the latter to open said valve.

4. In a prepayment gas meter, a valve port having a seat; an inclosure secluding said port; a valve for said port; a rock shaft carrying said valve, within said inclosure; a bearing bracket for said rock shaft, primarily separate from the wall of said inclosure, having a projection fitting an aperture in the wall of said inclosure, whereby its position is precisely determined; and means, within said inclosure, independent of said shaft, arranged to rock the latter to open said valve.

5. In a prepayment gas meter, a valve port having a seat; an inclosure secluding said port; a valve for said port; a rock shaft carrying said valve, within said inclosure;

a bearing bracket for said rock shaft, primarily separate from the wall of said inclosure, having a projection fitting an aperture in the wall of said inclosure, whereby its position is precisely determined; and means, arranged to rock said shaft to open said valve.

In testimony whereof, I have hereunto signed my name at Philadelphia, Pennsylvania, this eighth day of April, 1914.

JNO. GRIBBEL.

Witnesses:
S. E. SIMMONDS,
J. J. HAGERTY.

Copies of this patent may be obtained for five cents each, by addressing the "Commissioner of Patents, Washington, D. C."